March 1, 1938. B. WHITEFIELD 2,109,812
MACHINE FOR DIVIDING OR CUTTING TOFFEE, CARAMEL, OR LIKE MATERIAL
Filed Dec. 15, 1936 10 Sheets-Sheet 1

B. Whitefield
INVENTOR

By: Glascock Downing & Seebold
Attys.

March 1, 1938. B. WHITEFIELD 2,109,812
MACHINE FOR DIVIDING OR CUTTING TOFFEE, CARAMEL, OR LIKE MATERIAL
Filed Dec. 15, 1936 10 Sheets-Sheet 4

B. Whitefield
Inventor
By: Glascock Downing & Seebold
Attys.

B. Whitefield
Inventor

By Glascock Downing & Seebold
Attys.

March 1, 1938. B. WHITEFIELD 2,109,812
MACHINE FOR DIVIDING OR CUTTING TOFFEE, CARAMEL, OR LIKE MATERIAL
Filed Dec. 15, 1936 10 Sheets-Sheet 7

B. Whitefield
INVENTOR

By: Glascock Downing & Seebold
Attys.

March 1, 1938.    B. WHITEFIELD    2,109,812
MACHINE FOR DIVIDING OR CUTTING TOFFEE, CARAMEL, OR LIKE MATERIAL
Filed Dec. 15, 1936    10 Sheets—Sheet 8

B. Whitefield
INVENTOR

By: Glascock Downing & Seebold
Attys.

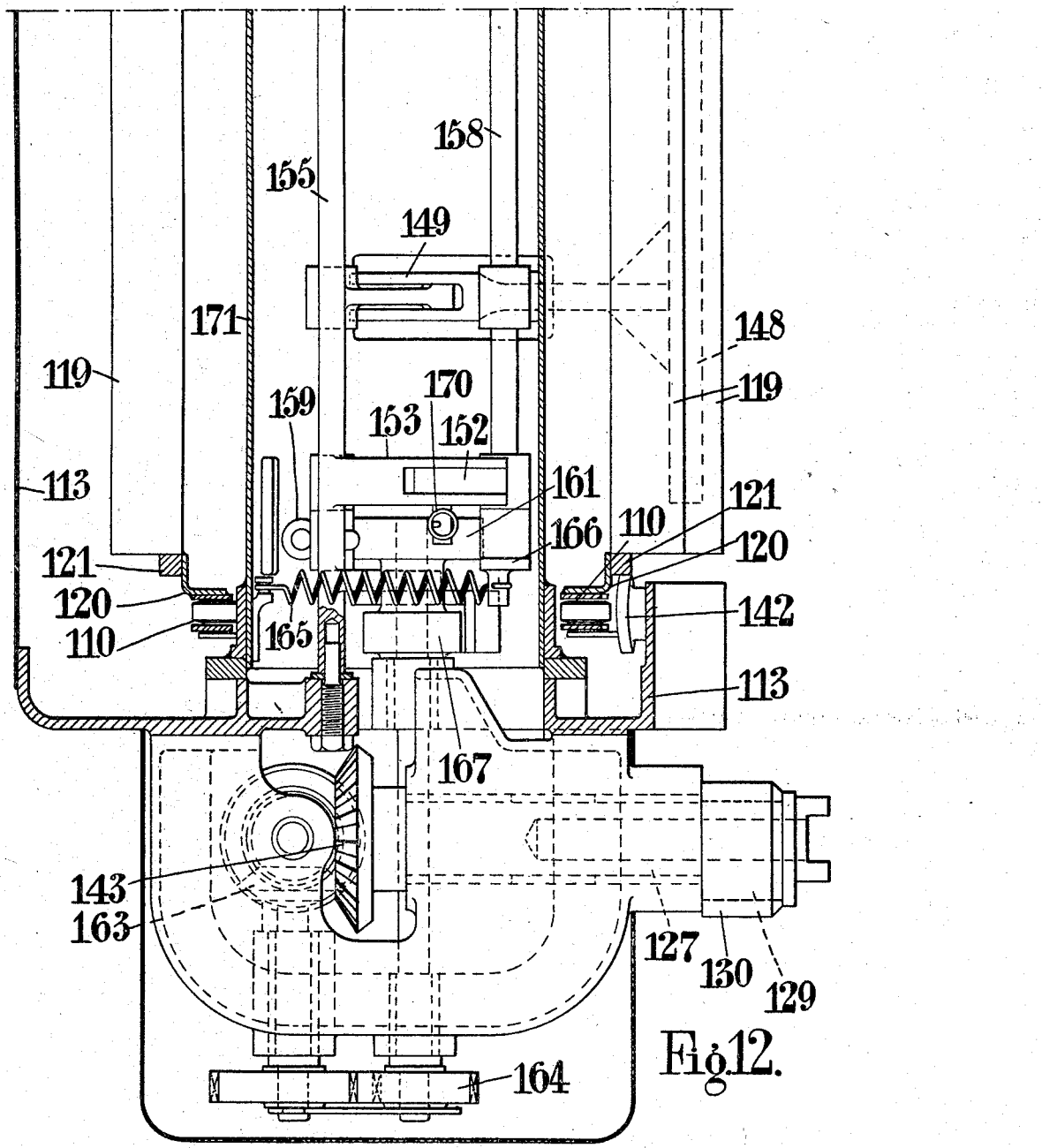

March 1, 1938.  B. WHITEFIELD  2,109,812
MACHINE FOR DIVIDING OR CUTTING TOFFEE, CARAMEL, OR LIKE MATERIAL
Filed Dec. 15, 1936  10 Sheets-Sheet 10
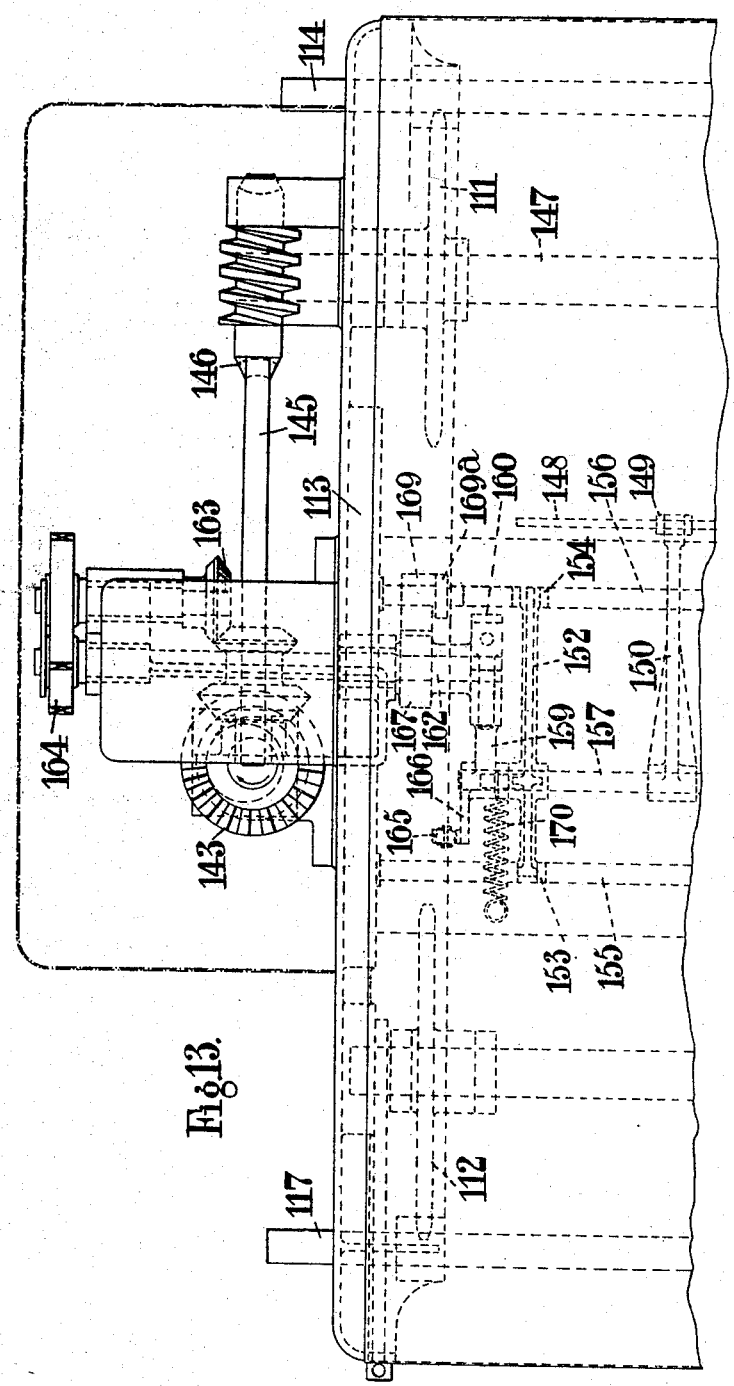

UNITED STATES PATENT OFFICE 2,109,812

MACHINE FOR DIVIDING OR CUTTING TOFFEE, CARAMEL, OR LIKE MATERIAL

Bernard Whitefield, Tottenham, London, England, assignor to Baker Perkins Limited, Northamptonshire, England Application December 15, 1936, Serial No. 116,037
In Great Britain December 20, 1935

19 Claims. (Cl. 107—21)

This invention relates to machinery for cutting or dividing toffee, caramel or the like material into square or other angular pieces or tablets, and has for an object the provision of machinery adapted to cut a continuously travelling sheet of toffee into a series of strips and feed them in spaced relationship for dividing into square, angular pieces or tablets, while a further object of the invention is to provide a machine adapted to divide a series of rods, strips or ribbons of toffee, travelling continuously, into squares, angular pieces or tablets.

It will be appreciated that owing to the cohesive nature or other characteristics of the continuously travelling material to be dealt with, several problems arise and it is an aim of the present invention to provide means adapted to effect their solution.

The invention consists in continuously feeding a sheet of toffee against cutting knives or rotary discs spaced apart at intervals equal to the width of the strips to be produced and in spacing the cut strips fanwise and maintaining them in spaced relationship for feeding to a machine for dividing the strips transversely.

The invention also consists in a machine having a series of transverse knives arranged in spaced relationship which are given a movement at a speed equal to and in the same direction as that of the travel of the toffee, while at the same time they are given a combined vertical and transverse reciprocating motion to divide the strips of toffee into tablets.

According to one form of the invention the knives are mounted in a block or frame to which the several movements are imparted.

Alternatively, the knives may be carried on an endless chain or chains the lower lap of which is inclined with respect to the longitudinal direction of travel of the toffee so that the latter is progressively cut while the knives are travelling forward and reciprocating transversely.

A further feature of the invention comprises the provision in a machine for transversely dividing strips of toffee, of longitudinal partition members for maintaining the strips of toffee in spaced relationship, which move longitudinally in the direction of the toffee movement and also have a vertical displacement during the cutting or dividing operation or are in the form of ramps of progressively diminishing height in the direction of longitudinal movement of the knives.

A further feature of the invention resides in the provision of a stripping device comprising bars which are located between the knives and adapted to travel longitudinally therewith but which remain at a fixed vertical height in order to prevent the toffee rising or adhering to the knives as they ascend.

Further features of the invention will be hereinafter described and defined in the claims.

In the accompanying drawings—

Figure 2a is a detail view of cam mechanism.

Figures 9 and 10 are views showing details.

Figures 11, 12 and 13 are side elevation, partial end elevation and partial plan respectively showing the mounting for knives and ejector mechanism for ejecting the cut toffee pieces.

Figure 1:
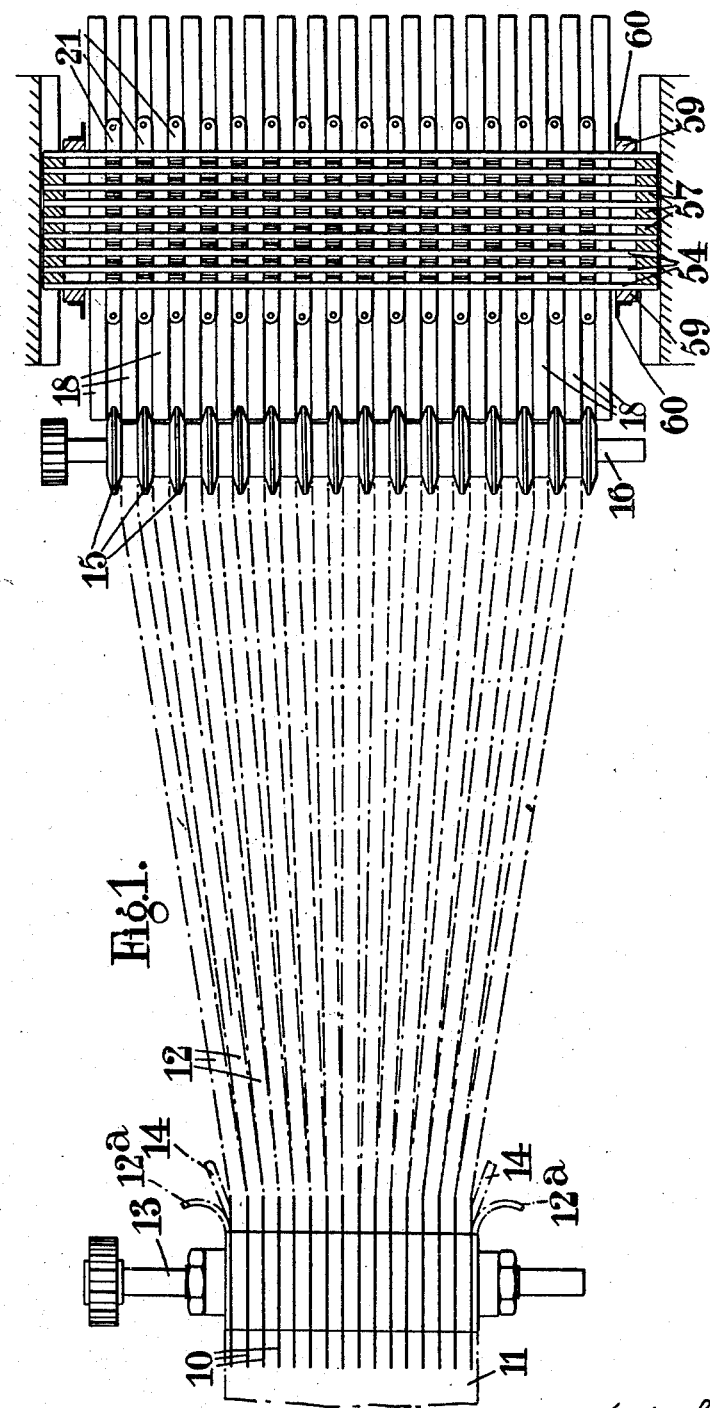
Figure 1 is a diagram showing in plan the slitting of a slab of toffee and the feed of the strips to the transverse cutting mechanism.

In carrying the invention into effect according to one convenient mode as applied to cutting or severing a continuous sheet of caramel or toffee into square or rectangular pieces, a series of rotary disc knives 10 (Figure 1) is employed for slitting the sheet of toffee 11 longitudinally as it is continuously fed forward, into strips 12 of a width equal to the desired width of the toffee pieces. The slitting knives or discs 10 may be adjustable on their shaft 13 in order to cut strips of different widths or the whole shaft carrying the stripping discs may be interchangeable with shafts having differently spaced discs. A pair of deflectors 14, one on each side of the toffee sheet, may be employed to divert the outer strips 12a cut from the sheet as these may be imperfect.

Figure 2:
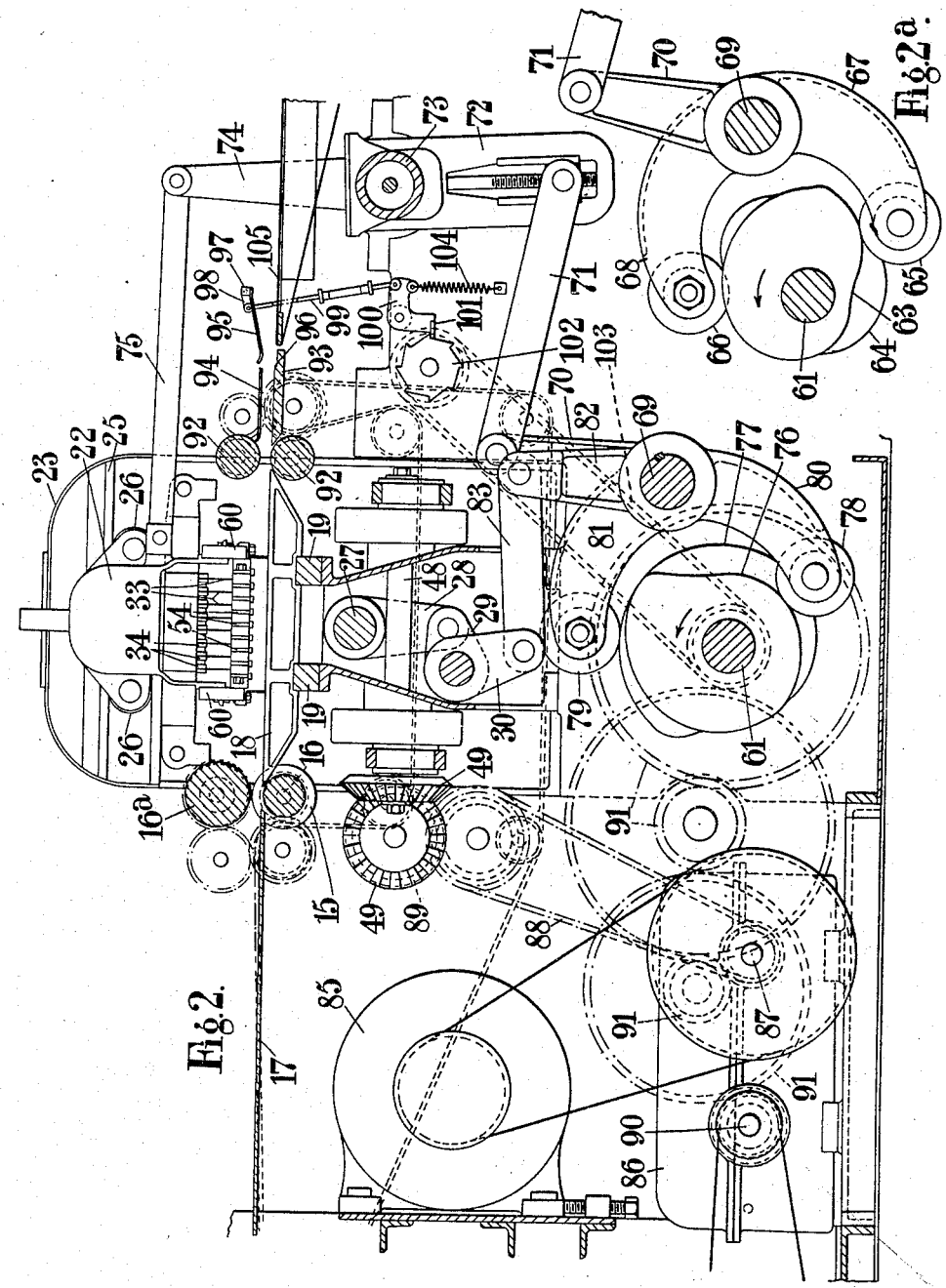
Figure 2 is a side elevation of a cutting machine according to the invention showing the driving arrangements.

The longitudinal strips of toffee 12 thus formed as they travel forward over a feed table 17 (Figure 2) are diverted outwardly fanwise so that they pass between a series of discs 15 which may be adjustably spaced on a rotary shaft 16 for the purpose of maintaining the strips spaced one from the other at regular intervals. The rotary shaft 16 with the strip spacing discs 15 is positioned below a drawing roller 16a at the feed end of the part of the machine for dividing the spaced toffee strips transversely into squares or rectangles. The strips 12 pass in parallel relationship over a table or platform with which the machine is provided. The table is formed of a series of fixed slats or flat topped bars 18 which register with the lines of toffee strips and each forms a support or bed for a toffee strip whilst it is traveling across the table and during transverse cutting. The table slats or bars 18 are supported upon a pair of transverse supporting bars 19 which are carried by a pedestal 20. A series of vertically displaceable partition means 21 lie between the fixed table slats or bars 18 and keep the toffee strips separate and in the proper position during cutting. The depth of the spaces between the table slats 18 is sufficient to accommodate the partitions 21 during their vertical reciprocations.

Over the table a cross or cutter head 22 is mounted, preferably on a spaced pair of vertically guided frames 23 located at each side of the machine. The frames 23 are guided at their upper and lower ends upon guide extensions 20a and 20b of the pedestal 20 so that they may partake of vertical reciprocations. The guide means provide guide surfaces in planes at right-angles and thus also maintain the frames 23 parallel to one another.

Figure 4:
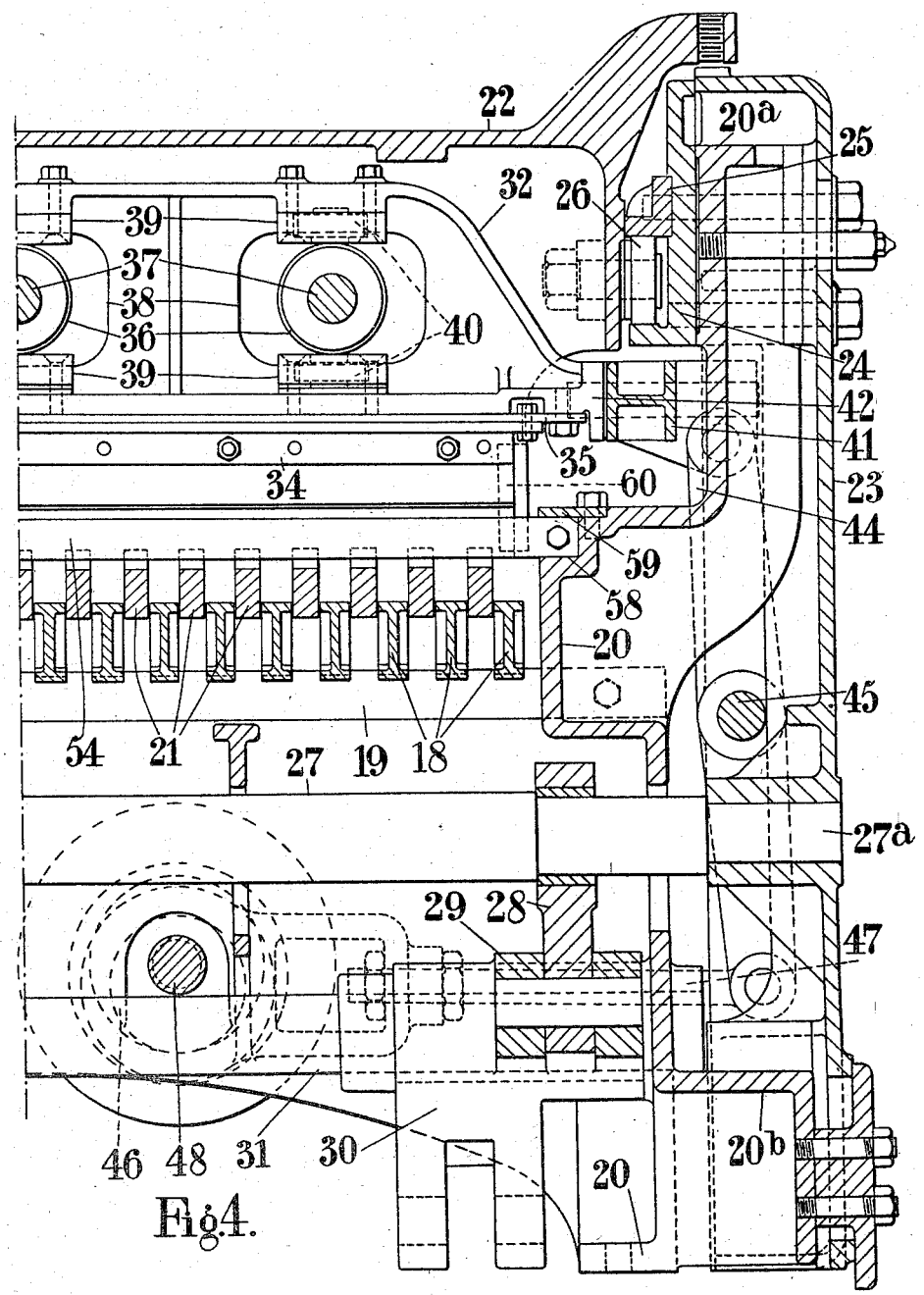
Figure 4 is a sectional end elevation of one half of the machine.
Figure 5:
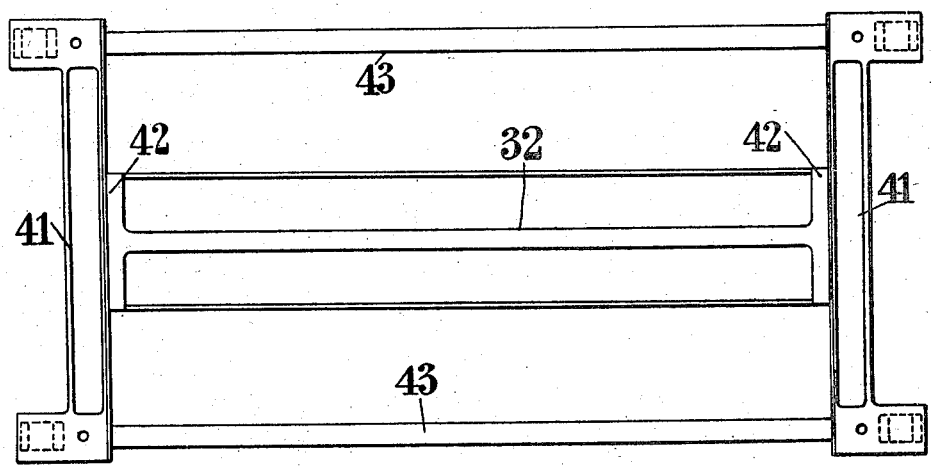
Figure 5 is a plan of certain details.

At their upper ends the frames 23 are provided with an inner plate 24 (Figure 4) bolted thereto which plates engage sliding surfaces on the pedestal 20. The plates 24 together with angles 25 form guideways for rollers 26 carried by the cross or cutter head 22 whereby the cutter head is guided in a movement parallel to the plane of the table slats 18 and in the direction of the feed of the toffee bars thereacross.

The frames 23 are connected by a shaft 27 located below the table slats 18 and transverse to the feed of the toffee. Adjacent each end of the shaft 27 a link or arm 28 is provided which is connected to one arm 29 of a bell crank lever 30 pivotally mounted upon a shaft 31 carried in the pedestal 20. The bell crank lever 30 is adapted to be oscillated by suitable cam means whereby a vertical reciprocation is imparted to the frames 23 and through the rollers 26 and guides 24, 25 to the cutter head 22, the extent of the stroke being sufficient to reciprocate a knife block which the cutter head carries, from a position above and clear of the toffee through or partly through the strips and back again. The reduced ends 27a of the shaft 27 which extends into the bearings in the side plate 23 may be eccentric to the parts of the shaft engaged by the arms 28 and means may be provided for rotatably adjusting the shaft in the bearings whereby an adjustable setting of the side plates and thus the knife block relatively to the bed 18 may be obtained.

The knife block comprises a ⊥-shaped frame 32 or like supporting means on which the knives 33 are secured in fixed spacing relationship, or they may be mounted in slots so that the spacing relationship may be varied, in order to cut the toffee strips in greater or lesser lengths according to the particular shape or dimensions of the tablets to be formed.

The partition members 21, like the knives 33 in the knife frame or block, may be secured at a fixed spacing relationship or they may be adjustable transversely of the bed of the machine in order to deal with strips of different widths. In the form illustrated the knives 33 are provided with clamps 34 which are bolted together and to a plate 35 which in turn is bolted to the ⊥-shaped frame 32.

The ⊥-shaped frame 32 is carried by the cross or cutter head 22 for which purpose the latter is provided with three guide or thrust rollers 36 carried by spindles 37. The rollers 36 are located in apertures 38 in the vertical web of the ⊥-shaped frame. The rollers 36 engage guide surfaces 39 mounted upon the ⊥-shaped frame so that the latter may partake of a movement relatively to the cutter head 22, such movement taking place in a horizontal plane transversely of the direction of feed of the toffee strips.

Associated with the ends of the ⊥-shaped frame 32 and engaging on either side of the guide surfaces 39 are guide rollers 40 which are carried by the cutter head 22. By means of these guide rollers 40 the ⊥-shaped frame and the knives 33 are maintained vertical.

Beneath the crosshead 22 side guide members 41 are provided which slidingly engage surfaces 42 on the ⊥-shaped frame 32. The guide members 41 are connected by rods 43 to form a frame. This guide frame is pivotally mounted upon arms 44 which are pivoted upon shafts 45 carried by the frames 23. The arms 44 at one side of the machine extend below the associated shaft 45 and are connected to eccentrics 46 by connecting rods 47. The eccentrics are mounted upon a shaft 48 carried in suitable bearings in the pedestal 20, the shaft being rotated through bevel gears 49.

As the arms 44 are rocked about the shafts 45, the guide frame 41, 43 is reciprocated transversely of the direction of feed of the toffee and thus communicates a transverse reciprocation to the knife block while permitting the latter to reciprocate longitudinally.

As the knife block frame 32, through the crosshead 22, is carried by the frames 23 and the latter carries the shafts 45, the sliding engagement between the frame 32 and the guide bars 41 is maintained as these parts will rise and fall together.

Figure 3:
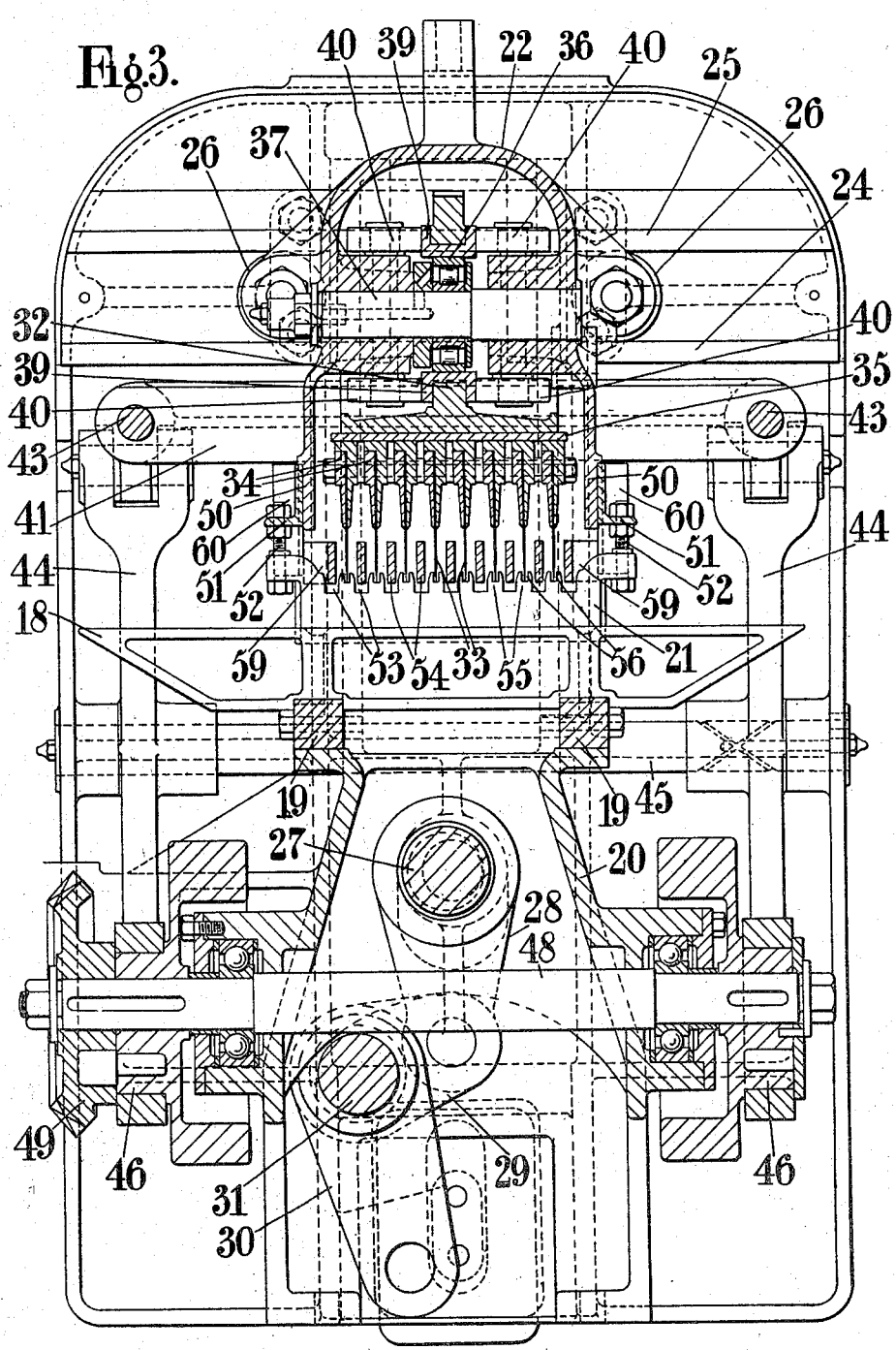
Figure 3 is a sectional side elevation of a cutting machine according to the invention.

The cutter crosshead 22 is provided with depending cheeks 50 to which angle bars 51 are secured and from which the partitions 21 are suspended by bolts 52. These partitions 21 comprise bars of elongated rectangular cross section which when viewed in side elevation (see Figure 3) display a series of vertical slots 53 entering their upper edge for the reception of stripper plates or bars 54. These slots 53 are arranged midway between each cutting knife 33 and the next and leave upstanding portions or teeth 55 the tops of which have shallow grooves 56 in which the edges of the cutting knives lie touching or just clear of the bottoms of the grooves.

The stripper plates or bars 54 serve the purpose of holding down the toffee when the knives rise and are formed as a unitary structure for which purpose they are bolted together at their ends, suitable distance pieces 57 being provided between adjacent bars (see Figure 1). The ends of the bars so secured together are slidingly mounted in guiding grooves in the pedestal 20 (see Figure 4), which grooves are formed by a rebate 58 and a cover plate 59. The grooves are arranged parallelly to the direction of the feeding movement of the toffee strips. The bars 54 are adapted to be reciprocated in a horizontal plane with the knife block for which purpose the outer bars 54 are provided with distance pieces 59 adapted to be engaged by depending strips or angles 60 carried by the angle members 51 to which they are welded or otherwise secured.

Figure 6:
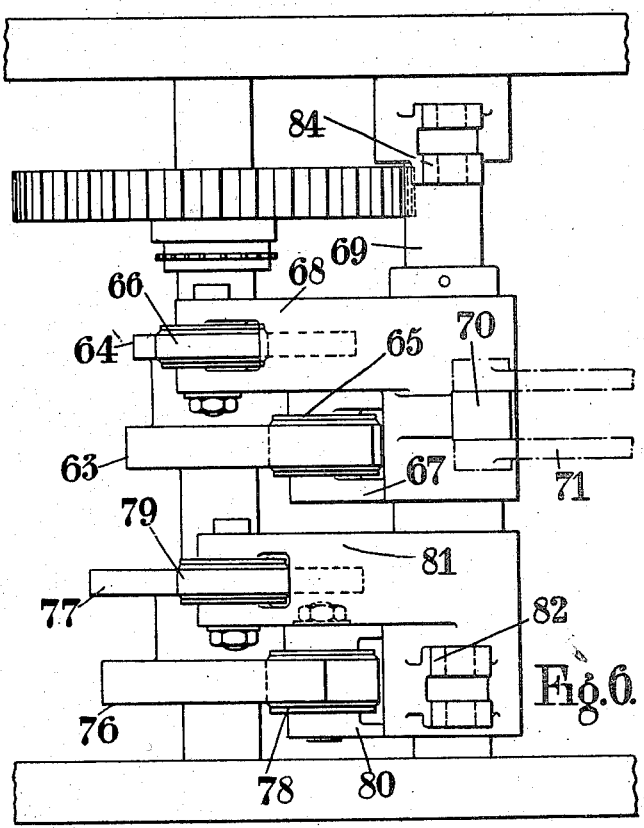
Figure 6 is a plan of a cam drive shaft.
Figure 7:
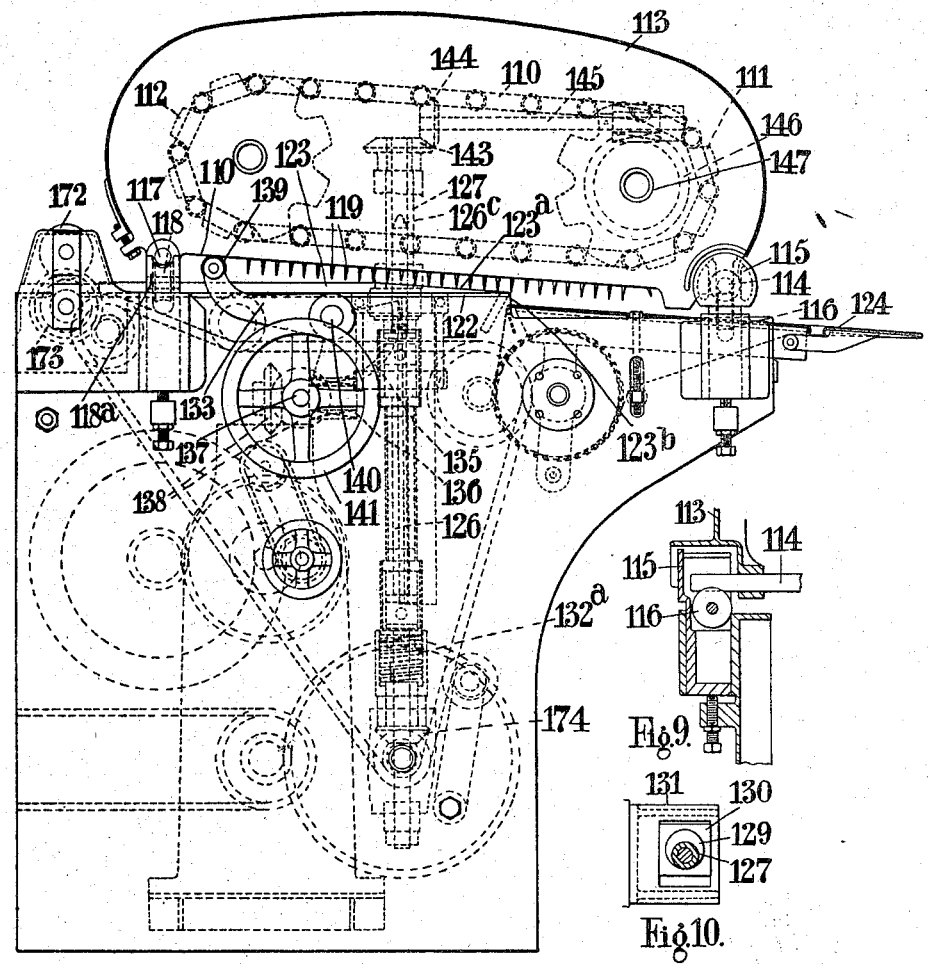
Figure 7 is a side view of a modified form of machine in which the knives are carried by travelling endless chains.
Figure 8:
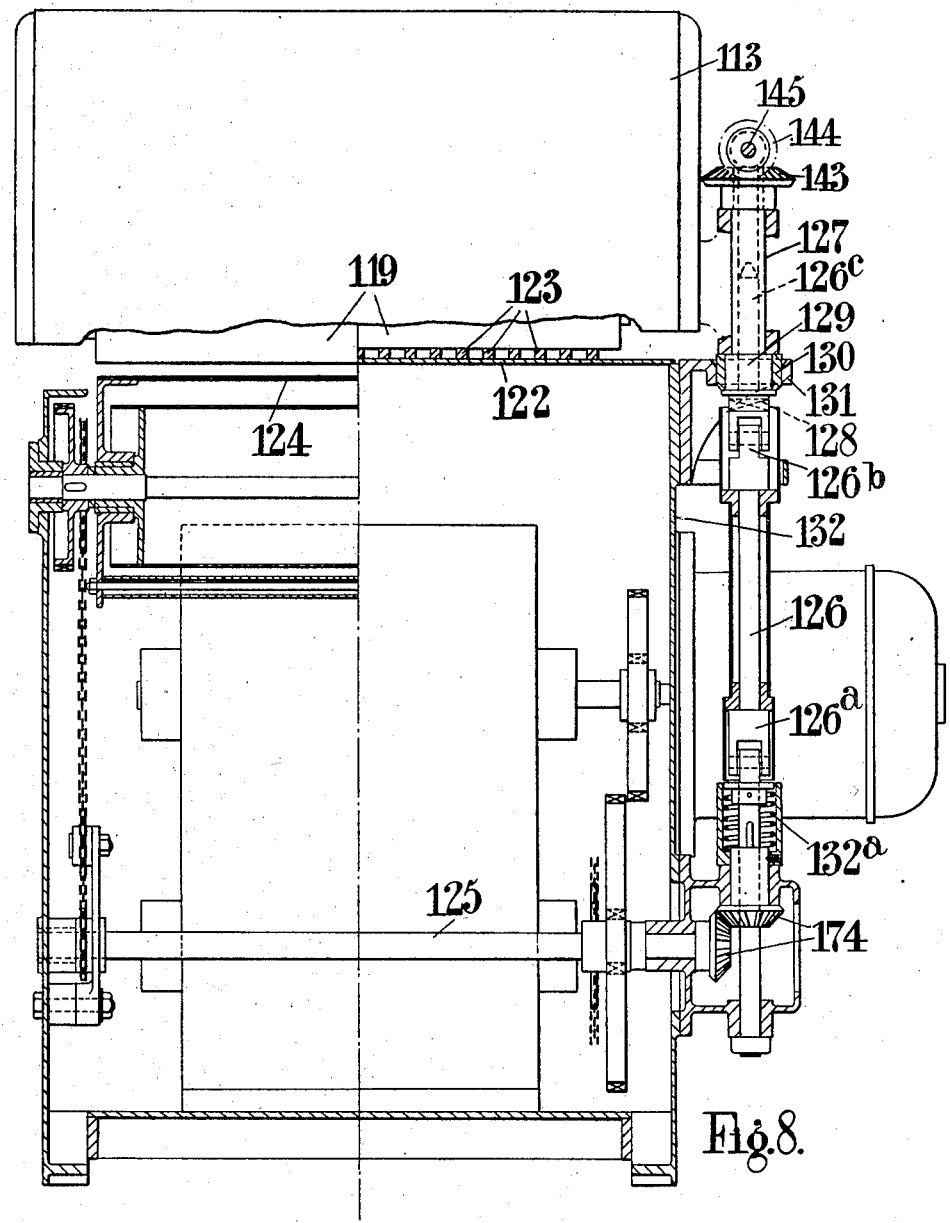
Figure 8 is an end view partly in section.
Figure 11:
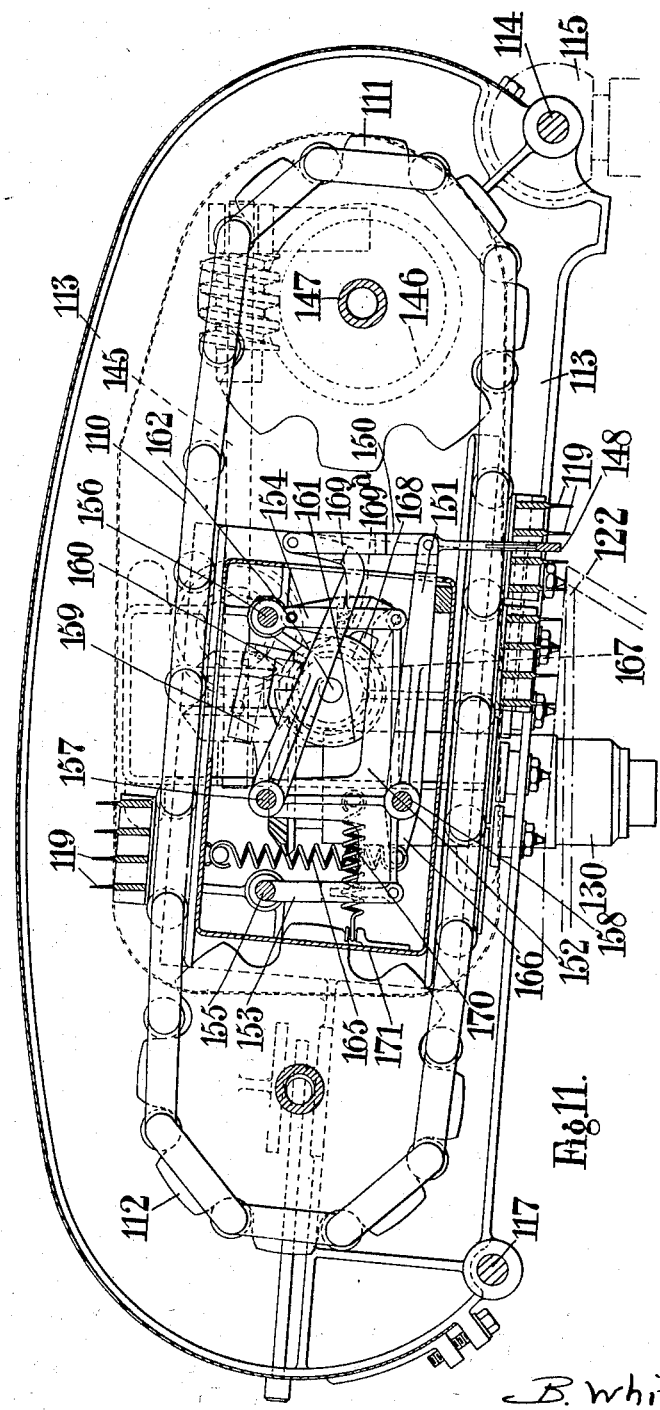

The reciprocation of the knife block in the direction of the feed of the toffee strips is obtained from a cam shaft 61 supported in bearings in a framing 62 on which the pedestal 20 is bolted. The shaft is provided with a pair of cams 63, 64 (Figures 2a and 6) engaging rolls 65, 66 on the arms 67, 68 of a three-armed lever pivotally mounted on a shaft 69. The third arm 70 of said lever is connected by a link 71 to an arm 72 depending from a rock shaft 73 which is provided with two upstanding arms 74 adjacent the sides of the machine. The arms 74 are coupled to the cutter crosshead 22 by connecting rods 75 (see Figure 2). The connection of the link 71 to the arm 72 is adjustable whereby the speed of the knife block during the forward reciprocation may be synchronized with the feed of the toffee. The shape of the cams 63, 64 is preferably such that the return reciprocation of the cutter crosshead is effected at a higher speed than the forward reciprocation.

The stroke of the block of knives and their rate of travel on the return stroke are so arranged as to leave a space between adjacent batches of cuts equal to the length of one cut toffee piece. In other words the number of cut pieces per cycle is equal to the number of knives in the block.

The cam shaft 61 is provided with a second pair of cams 76, 77 which engage rollers 78, 79 on the arms 80, 81 of another three-armed lever which is keyed upon the shaft 69 adjacent one side of the machine. The third arm 82 of said lever is connected by a link 83 to the bell crank lever 30 whereby vertical reciprocations are imparted to the side frames 23 and thus to the knife block. The bell crank lever 30 at the other side of the machine is similarly connected to a lever 84 (see Figure 6) keyed upon the shaft 69.

The parts of the machine are driven from a motor 85 through a change speed box 86 the primary shaft 87 of which is geared by a sprocket chain 88 and gearing 89 to the bevel gears 49 for driving the eccentric shaft 48 by which the short cutting reciprocations are imparted to the knives 33.

The secondary shaft 90 drives the cam shaft 61 through a train of gears 91. The secondary shaft 90 is also utilized for driving the rotary slitting knives 10 by a transmission (not shown).

The operation of the transverse cutting mechanism described above is as follows:—

The rate of continuous forward travel of the toffee is adjusted in relation to the knife stroke and rate of operation so that as the heads of the strips of toffee pass under the foremost knife of the block the knives are pushed down by the crosshead 22 by the action of the cam 76, and whilst the knives 33 are reciprocating transversely, and moving longitudinally at the same rate of travel as the toffee. The downward cutting movement of the knives is adapted to be completed before the knives reach the end of their forward stroke and as the knives approach the end of the forward stroke the knife block is raised by the crosshead through the cam 77 whilst still travelling forward with the toffee until the knives reach the same level as that at which they started. The knives then travel back horizontally to their original position whilst the toffee strips underneath continue travelling forward to bring a fresh area underneath that in which the knives will descend. It is preferred that the toffee should travel forward a distance equal to the length of the batch of knives plus the additional width of the toffee piece.

With the mechanism described the transverse cutting reciprocation of the knives takes place throughout the longitudinal reciprocation of the knife block and the upward and downward movements of the knives. Alternately, the cutting reciprocation may be confined to the downward stroke of the knife block or during the downward stroke and during the upward stroke whilst they are clearing the cut toffee.

It will be appreciated that while the knives 33 are descending the partitions 21 also descend, sliding between the fixed bars or beds 18 for the strips of toffee. By the provision of the grooves 56 in the projecting parts 55 of the partitions 21 the strips of toffee are laterally guided and positioned, even when the knives are in their lowest position, by the upstanding outer side of the walls of the groove.

Any tendency of the toffee to rise with the knives 33 or partitions 21 due to sticking, is prevented by the stripper bars 54 which act to knock the toffee back again onto its bed against the lifting action of the knives or partitions.

While for producing rectangular tablets the knives 33 lie at right-angles to the direction of feed of the toffee strips, where it is desired to produce lozenge or like shaped pieces the knives are disposed to cut across the strips obliquely and are correspondingly reciprocated transversely of the strip at an appropriate angle. Alternatively the strips of toffee may be fed at an oblique angle to the knives 33 instead of at right-angles with the strip separating partitions arranged at a corresponding angle and reciprocated in alignment with the strip of toffee.

Where the knives 33 do not cut entirely through the toffee, which is a preferred procedure, the strips of toffee with the transverse incisions are fed forward between rolls 92 to a fracturing device which is adapted to break the narrow links uniting the rectangular tablets of the strips together. The rolls 92 feed the strips over a table 93 and beneath a hold-down plate 94 to the fracturing device which comprises a series of spring fingers 95 mounted above the path of the toffee strips and extending over the end of the table 93, such end being reduced to provide a breaking edge 96. The fingers 95 are carried by a pivotally mounted bar 97 having an arm 98 to which an adjustable coupling rod 99 is connected, the other end of the rod being connected to a trigger device. The trigger device comprises a pivoted lever plate 100 having a tooth 101 engaged by a ratchet wheel 102 which is rotated by a sprocket chain 103 from the camshaft 61. As the sprocket rotates clockwise as seen in the figure the lever plate 100 is turned anticlockwise to raise the fingers 95, at the same time stressing a returning spring 104.

When the tooth 101 is released from the ratchet wheel the lever plate will snap back under the action of the spring 104 to bring down the fingers 95 sharply onto the top of the toffees, preferably in timed relation to the incisions in the toffee strips coinciding with the edge 96.

The completely severed pieces as they are fed or pushed forward travel onto an endless conveyor band 105 for further treatment, for example, the machine may be used to feed direct to a chocolate coating machine the spaced relationship of the cut pieces to one another being particularly useful for this purpose, or the cut sweets may be carried forward for collection and packing.

Alternatively, the severance may be completed by breaking the strips progressively by rapping upon the lower surfaces.

In carrying the invention into effect according to another mode (see Figures 7-13) a pair of endless chains 110 is provided which are mounted to travel in parallel vertical planes. The chains are carried upon spaced pairs of sprockets 111, 112 of which 111 are the driving sprockets while the sprockets 112 act as guides and may be adjusted to adjust the chains. The shafts upon which the sprockets are mounted are carried by a casing 113 which is pivotally mounted at one end by means of a cross shaft 114 which seats at its ends within forked bearing brackets 115 upon freely mounted grooved wheels 116 which are carried by the bearing brackets. At its other end the casing is provided with a transverse rod 117 which is supported upon grooved wheels 118 carried in brackets 118a. The arrangement is such that transverse movement may be imparted to the casing and thus to the sprocket chains carrying the knives while by the guiding forks of the bearing brackets 115 the casing may be pivoted upwardly upon the axis of the bar 114. The brackets 115 and 118a may be adjusted vertically and thus adjust the line of travel of the knives.

The knives 119 are mounted in blocks of four by being bolted or otherwise secured together, suitable distance spaces being provided. Each block of knives extends transversely and is secured at its ends to corresponding links in each chain, for which purpose the inner bars of the links are provided with an angle piece 120 welded thereto and to which the block of knives is bolted by means of side strips 121.

The casing when the knives are in their operative position is mounted so that the knives as they are moved through the lower lap of the chains will travel through a path inclined downwardly and thus each knife will progressively move downwardly with regard to the horizontal. The toffee strips are fed along a horizontal table 122 located beneath the knives, such table being provided with partitions or ramps 123 which separate the strips of toffee. These partitions are provided with an incline 123a at the forward end corresponding to the cutting zone, such incline corresponding to the inclined path of travel of the knives so that the toffee strips as they are fed along the table will be progressively cut as the knives descend owing to their inclined path.

The strips of toffee are adapted to be completely cut through and at the end of the table there is an abrupt drop at 123b so that the cut pieces of toffee when released from the knives will fall down onto a delivery conveyor 124.

The drive to the knife-carrying chains is effected from a shaft 125 which drives a vertical Cardan or articulated shaft 126 through bevel gear 174. This Cardan shaft in turn drives a shaft 127 which is carried in bearings secured to the casing 113 and in order to permit the casing and the knives being pivoted upwardly a dog clutch 128 is provided between the shafts 126 and 127.

The shaft 127 is also arranged to impart a lateral reciprocatory movement to the casing 113 and thus impart a cutting movement to the knives. For this purpose the shaft 127 has secured thereto an eccentric 129 which has a surrounding sheave 130 the outer sides of which form the sides of a square. This sheave seats within a guide bracket 131 which is fixed upon a stationary part 132 forming the mounting of the machine. The guide bracket when viewed transversely of the machine is of greater dimension than the square sheave 130 so that the latter may reciprocate in the guide bracket in the direction of the feed movement of the chains, whereas it is prevented from movement in a transverse direction thereto.

By this arrangement as the shaft 126 rotates the sleeve shaft 127 through the dog clutch, a transverse movement will be imparted to the sleeve shaft 127 and thus to the casing 113 upon which it is mounted but the movement imparted by the eccentric in a direction at right angles thereto will be taken up by the square sheave 130 moving in its guide bracket 131. Such relative movement between the axes of the shafts 127 and 128 will be permitted by the articulated couplings 126a and 126b of the shaft 126.

The shaft 127 at its upper end is provided with a bevel wheel 143 meshing with a bevel 144 on a worm shaft 145 which drives a worm wheel 146 on the shaft 147 which carries the driving sprockets 111 whereby the chains are driven and the knives moved in their endless path.

The upper coupling 126b is provided with an upwardly extending pin 126c having a coned end which is adapted to enter an axial bore in the lower end of the shaft 127 for the purpose of maintaining the shafts in alignment when the casing is raised about the pivot 114 for cleaning the knives or other reason. When the casing is pivoted upwardly it will be appreciated that the squared sheave 130 will be raised with the shaft 127 and in order to guide the sheave 130 back into its guiding bracket 131 the upper edge of the aperture in the latter is bevelled off and, similarly, the lower edges of the squared sheave are bevelled.

At the lower end the shaft 126 is provided with a spring 132 which allows for the parts of the dog clutch 128 not being in the correct position when the engagement of the shafts is being effected.

At the end of the casing adjacent the bracket 118a a pivoted arm 133 is provided which is fixed upon a shaft 134 carried in bearings on the stationary mounting 132. The shaft 134 also carries a toothed quadrant 135. The quadrant meshes with a worm 136 adapted to be driven from a shaft 137 through bevel gear 138. The arm 133 is provided with a roller 139 engaging a surface 140 on the casing 113 and by the manipulation of the shaft 137 by the hand wheel 141 the casing may be pivotally moved about the axis of the supporting rod 114.

In order to provide rigidity for the knives during their transverse cutting action the casing 113 is provided with guide rolls 142 in the cutting zone which guide rolls are adapted to be engaged by the bars 121 associated with the knife blocks.

It will be appreciated that the toffee pieces when the cut is completed will stick to the knives as the latter pass over the edge of the table and an ejecting device is provided for releasing such toffee pieces and delivering them to the delivery conveyor.

The ejecting device comprises a bar 148 which extends transversely of the toffee feed and is carried by arms 149 which are pivotally connected to pairs of levers 150, 151. These levers 150 and 151 are pivotally mounted upon ⊥-shaped frames 152, the latter being supported by links 153 and 154 from cross rods 155, 156, which are supported at their ends in the casing 113. The connection between the levers 150, 151 and the ⊥-shaped frame is effected by cross rods 157, 158.

On the cross rod 157 an arm 159 is mounted which carries a tooth 160 adapted to engage a rotary cam 161 on a shaft 162 which is driven from the shaft 145 through bevel gear 163 and change gearing 164.

The cam 161 is provided with a sharp drop and the arrangement is such that when the tooth 160 is on the high part of the cam the system of levers 150 and 151 will be raised so that the ejector bar 148 is in a position, when released by the cam, to be drawn down sharply onto the top of the toffee pieces by means of a spring 165 which is connected to an arm 166 on the lever 151.

It will be appreciated that after the bar 148 has ejected the severed row of toffee pieces it has to return upwardly between the pair of knives and into a position for coinciding with the space between the succeeding knives, and for this purpose a swinging movement is imparted to the system of levers 150, 151 by the supporting ⊥-shaped frame 152. This swinging movement is accomplished by another rotary cam 167 on the shaft 162 with which a tooth 168 is adapted to engage, the tooth being carried by an arm 169 which is adjustably mounted upon a lever 169a carried by the shaft 156. In order to hold up the tooth 168 to its cam 167 a spring 170 is mounted between the ⊥-frame 152 and a relatively fixed part, which conveniently comprises an enclosing box or casing 171 surrounding the mounting and the operating mechanism for the ejector bar.

In operation, as the separated strips of toffee are fed forwardly by draw rolls 172, 173 and between the partition members 123, they will be engaged by the knives which are fed forward at the same rate as the toffee feed. By the inclined arrangement of the knives they will be progressively lowered into the toffee strips and at the same time will be given a transverse cutting reciprocation through the movement of the casing 113. As each knife reaches the end of the table it will have reached a position such that the leading row of toffee pieces will be cut through and severed from the toffee strips, and as such row of toffee pieces project over the end of the table an ejecting blow will be imparted by the bar 148 whereby they will be released from the knives and delivered onto the take-off conveyor 124.

Should the cut not be completely through the toffee strips but a connecting fin be left between successive pieces, these will be severed by the blow of the ejector bar upon the row of pieces which overhang the table, the succeeding row of pieces being of course still supported by the table.

Instead of the described arrangement of mechanism for effecting the transverse cutting movement any other means may be provided separate from the shafts in which case the Cardan shaft may be dispensed with and the drive to the shaft 127 effected by a flexible shaft connection.

I claim:

1. A machine for transversely cutting or dividing toffee or the like in strip form, comprising a plurality of knives, means for vertically displacing and transversely reciprocating said knives while travelling with the toffee, and partition means for holding the toffee against lateral displacement, said partition means conforming to the vertical displacement of the knives during cutting.

2. A machine for transversely cutting or dividing toffee or the like in strip form, comprising a plurality of knives, means for vertically displacing and transversely reciprocating said knives while travelling with the toffee, partition means for holding the toffee against lateral displacement, and means for moving the partition means downwardly in accordance with the vertical displacement of the knives.

3. A machine for transversely cutting or dividing toffee or the like in strip form, comprising a plurality of knives, means for vertically displacing and transversely reciprocating said knives while travelling with the toffee, partition means for holding the toffee against lateral displacement, said partition means comprising a ramp diminishing in height in the direction of travel of the toffee to conform to the vertical displacement of the knives.

4. In a machine for transversely cutting or dividing toffee or the like as claimed in claim 2, a stripping device comprising bars located between the knives at a fixed vertical height to prevent toffee adhering to the knives as they ascend, and means for moving the stripper bars longitudinally with the knives.

5. A machine for transversely cutting or dividing toffee or the like as claimed in claim 2, wherein the knives are mounted in a block, a cutter head supporting said block and extending transversely of the feed of the toffee, side frames carrying said cutter head, means for reciprocating the side frames vertically, and means for reciprocating the cutter head relatively to the side frames in the direction of the feed of toffee.

6. A machine for transversely cutting or dividing toffee or the like as claimed in claim 2, wherein the knives are mounted in a block, a cutter head supporting said block and extending transversely of the feed of the toffee, side frames carrying the cutter head, means for reciprocating the side frames vertically, means for reciprocating the cutter head relatively to the side frames in the direction of the feed of toffee, a horizontally disposed guide frame within which the knife is located, said guide frame being mounted in said side frames, and means for reciprocating the guide frame transversely of the direction of the feed of the toffee.

7. A machine for transversely cutting or dividing toffee or the like as claimed in claim 2, wherein the knives are mounted in a block, a cutter head supporting said block and extending transversely of the feed of the toffee, vertically reciprocable side frames carrying the cutter head, said cutter head having depending cheeks supporting said partition means whereby they are vertically displaced with the cutter head.

8. A machine for transversely cutting or dividing toffee or the like as claimed in claim 2, wherein the knives are mounted in a block, a cutter head supporting said block and extending transversely of the feed of the toffee, vertically reciprocable side frames carrying the cutter head, said partition means having slots in their upper edges, stripper bars between the knives and located in said slots, said partitions having upwardly extending teeth between said slots, said teeth being grooved to receive the knives.

9. A machine for transversely cutting or dividing toffee or the like as claimed in claim 2, wherein the knives are mounted in a block, a cutter head supporting said block and extending transversely of the feed of the toffee, vertically reciprocable side frames carrying the cutter head, a stripping device comprising bars located between the knives at a fixed height, said bars forming a unitary structure guided in grooves in a stationary support, said cutter head having depending cheeks which support the partition means, fingers depending from said cheeks and located on either side of said unitary structure, whereby movement in the direction of feed of the toffee is imparted to the stripper bars.

10. A machine for simultaneously cutting or dividing a plurality of strips of toffee or the like as claimed in claim 2, wherein the toffee strips are supported by a table comprising a plurality of spaced bars between which partitions are located, said bars being fixed to a stationary support.

11. A machine for transversely cutting or dividing toffee or the like as claimed in claim 2, wherein the cutting movement of the knives is such that the pieces of toffee remain attached to one another, and pass to a fracturing device comprising rapping means adapted to impart a sharp blow to the pieces to sever them from one another.

12. A machine for transversely cutting or dividing toffee or the like as claimed in claim 3, comprising a series of spaced transverse knives, an endless chain supporting the knives, the lower lap of said chain being parallel with the partition ramps so that the toffee is progressively cut while the knives are travelling forward with the chain and reciprocating transversely.

13. A machine for transversely cutting or dividing toffee or the like comprising a series of spaced transverse knives, endless chains supporting the knives, a mounting for said chains, a shaft carried by said mounting and driving said chain, said shaft imparting transverse reciprocations to the mounting, partition means for holding the toffee against lateral displacement and comprising ramps diminishing in height in the direction of travel of the toffee, the lower lap of said chains being parallel with the partition ramps so that the toffee is progressively cut.

14. A machine for transversely cutting or dividing toffee or the like as claimed in claim 13, wherein said shaft carries an eccentric working in a sheave located within guide means carried by a relatively fixed part, said guide means permitting movement of the sheave in a direction parallel to the travel of the knives but preventing movement transversely thereto.

15. A machine for transversely cutting or dividing toffee or the like as claimed in claim 13, wherein ejector means are carried by said mounting and comprise a transverse bar, means for moving said bar between adjacent knives in a direction at right angles to the travel of the chains, and for moving it in the direction of said travel.

16. A machine for transversely cutting or dividing toffee or the like as claimed in claim 13, wherein ejector means are provided comprising a bar carried by levers forming a parallel motion linkage, a pivotally mounted frame supporting said linkage, means for imparting movement to said frame parallel to the movement of the chains, said movements being controlled by rotary cams.

17. A machine for transversely cutting or dividing toffee or the like as claimed in claim 13, wherein the knives are arranged in blocks rigidly connected to corresponding links in said chains.

18. A machine for transversely cutting or dividing toffee or the like as claimed in claim 13, wherein the mounting is pivotally movable to or from its operative position.

19. A machine for simultaneously cutting or dividing a plurality of strips of toffee or the like transversely as claimed in claim 1, wherein means are provided for dividing a sheet of toffee into strips, comprising a plurality of rotary disc cutters, means for feeding a sheet of toffee against said cutters, spacing the strips thus formed fanwise and feeding the strips in spaced relationship into the spaces between said partition means.

BERNARD WHITEFIELD.